UNITED STATES PATENT OFFICE.

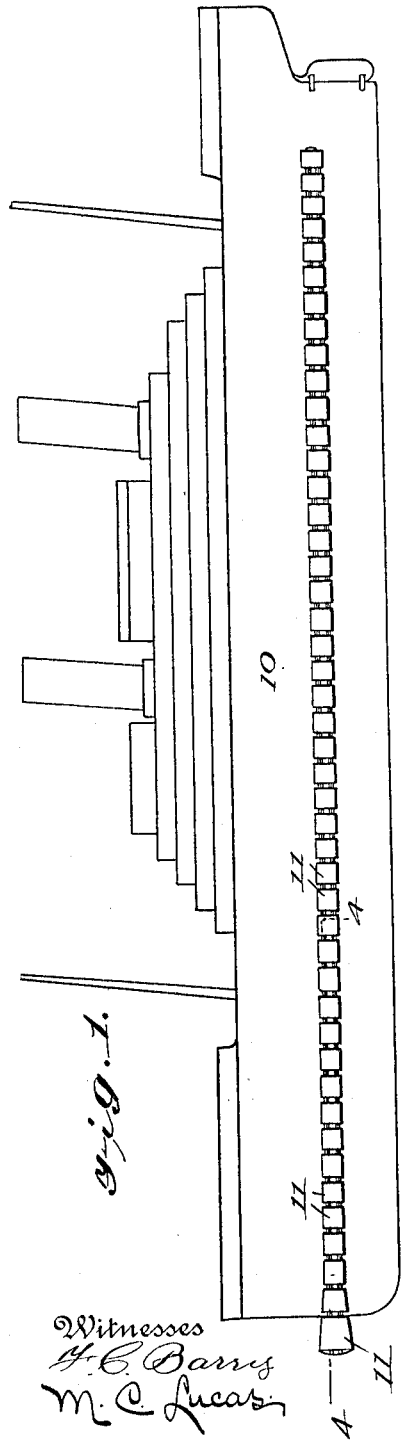

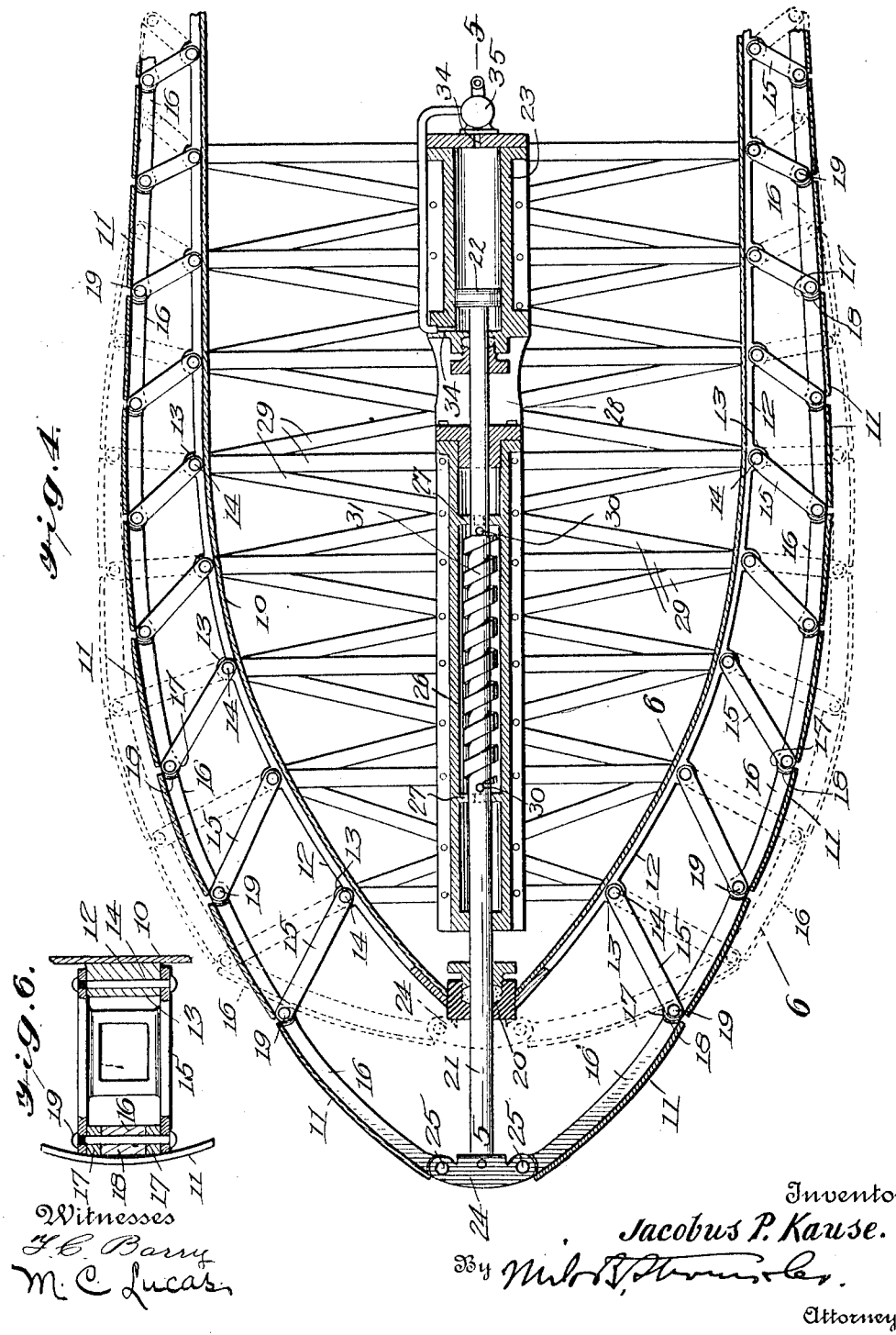

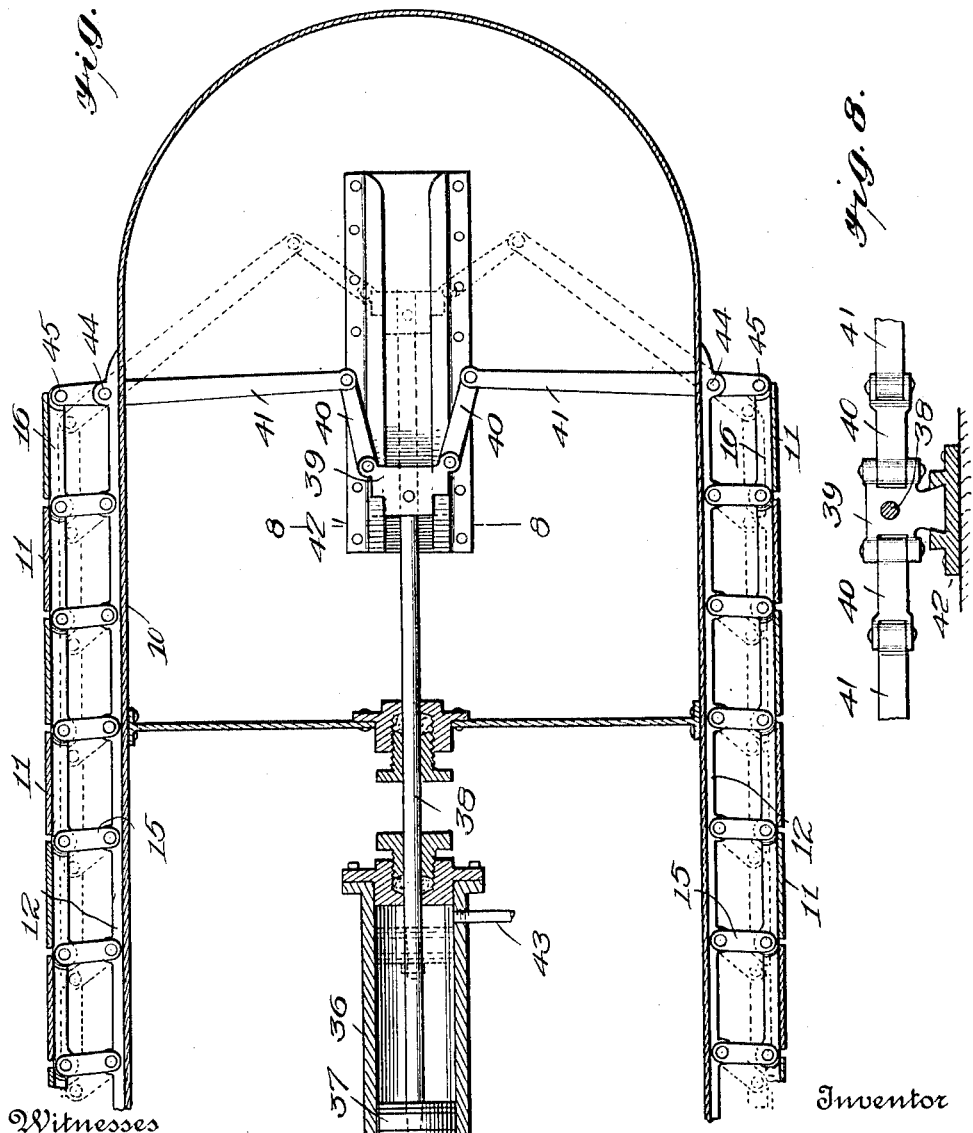

JACOBUS PHILIPPUS KAUSE, OF CHICAGO, ILLINOIS.

FENDER FOR SHIPS.

1,117,579.  Specification of Letters Patent.  Patented Nov. 17, 1914.

Application filed April 23, 1914. Serial No. 833,920.

*To all whom it may concern:*

Be it known that I, JACOBUS PHILIPPUS KAUSE, a subject of the Queen of the Netherlands, residing at Chicago, in the county of Cook and State of Illinois, have invented certain new and useful Improvements in Fenders for Ships, of which the following is a specification.

This invention relates to fenders for ships designed to prevent injury to the hull from collision or other causes.

It is the object of the present invention to provide a novel and improved fender of the kind stated, which is simple in construction, and which will operate in an effective manner to absorb the shock or jar resulting from a collision.

With this object in view, the invention consists in a combination and arrangement of parts to be hereinafter described and claimed, reference being had to the accompanying drawings, in which—

Figure 1 is a side elevation of a ship equipped with my improved fender; Fig. 2 is an elevation of a fragment of the fender drawn to an enlarged scale; Fig. 3 is an elevation showing the inner side of the fender, one of the fender sections being shown separated; Fig. 4 is an enlarged horizontal section on the line 4—4 of Fig. 1; Fig. 5 is a longitudinal section on the line 5—5 of Fig. 4; Fig. 6 is a cross-section on the line 6—6 of Fig. 4; Fig. 7 is a horizontal section showing the shock absorbing means for the rear portion of the fender, and Fig. 8 is a cross-section on the line 8—8 of Fig. 7.

Referring specifically to the drawings, 10 denotes the hull of a ship equipped on each side with a fender constructed and arranged in accordance with the present invention. The fender is composed of a series of buffer plates 11 extending along both sides of the hull from the bow to the stern. The fender is located above the water-line to render it less exposed to wear. On the outside of the hull is rigidly mounted a steel belt 12 having lugs 13 at regular intervals to receive and hold pivot pins 14. To the lugs are pivoted, by means of the pins, the inner ends of links 15. These links are substantially H-shaped, they being composed of top and bottom arms which are connected by a web, as clearly shown in Fig. 6. The inner ends of the arms straddle the lugs 13 and the pins 14 pass therethrough. The outer ends of the arms are connected to blocks 16 which are connected end to end by hinge joints and carry the buffer plates 11, said plates being mounted on the outer faces of the blocks. One end of each block has vertically spaced hinge knuckles 17 and the other end a hinge knuckle 18. The knuckle 18 fits the knuckles 17 of the adjacent plate, and by means of a pin 19 passing through said knuckles, a hinge connection between the blocks is made. The outer ends of the arms of the links 15 straddle the hinge connections and the hinge pins 19 pass through said ends of the arms. Thus, it will be seen that the fender is a flexible belt which is held normally spaced from the hull by means of the links 15.

In the stem of the hull 10 is mounted a stuffing box 20 through which passes the stem 21 of a plunger 22 mounted for reciprocation in a cylinder 23 suitably supported in the hold or on one of the decks of the ship. The plunger stem extends forward from the bow of the ship and carries at its outer end a head 24 having ears on opposite sides to which the blocks 16 of the fender belt, at the forward ends thereof, are pivotally connected, as indicated at 25. Thus the fender belt is also connected to the plunger stem, the purpose of which will be presently made clear. The intermediate portions of the plunger stem 22 passes through a housing 26 containing two spaced partitions 27 provided with openings through which the plunger stem passes. This housing and the cylinder 23 are supported on a suitable bed 28, between which latter and the hull 10 extend braces 29.

Between the partitions 27, the plunger stem 22 carries two spaced abutments 30, and between these abutments a spring 31 is coiled around the plunger stem. The diameter of this spring is such that it cannot pass through the openings in the partitions, said openings however allowing the abutments 30 to pass therethrough. Thus it will be seen that the spring is compressed when one of its ends reaches a partition and the plunger stem continues to travel in the same direction. The abutment 30 first passes through the opening in the partition, and then the spring end comes in contact with the partition. This action takes place when the plunger stem travels in either direction, the forward partition stopping the spring when the plunger stem travels forward, and the rear partition stopping the spring when said stem travels rearward. The function of the spring is to resist the travel of the plunger stem for the purpose to be presently described.

The cylinder 23 has inlet ports 32 in its ends for compressed air or other fluid pressure. Valves 33 control these ports. The ends of the cylinder also have relief ports 34 leading to a safety valve 35 which opens to allow escape of excess pressure.

When the parts are in their normal position, the plunger 22 is at the forward end of the cylinder 23 in which position of the plunger, the head 24 of the stem 21 is held in advance of the bow of the ship, and the fender plates 11 are held spaced from the sides of the hull, the links 15 extending diagonally between the hull and the fender, as shown in Fig. 4. The spring 31 is inactive, it being held between the abutments 30.

With the parts in the hereinbefore described position, if a head-on collision takes place, the plunger stem 21 is forced rearward, its rearward travel being resisted by the spring 31 when the latter reaches the rear partition 27. Compressed air or other fluid under pressure is also admitted into the cylinder 23 to the rear of the plunger 22, whereby the rearward travel of the stem is still further resisted, and the jar and shock resulting from the collision is absorbed, thereby preventing injury or damage to the hull 10 or materially reducing the same. If the fender belt is struck from the side the oblique position of the links 15 tends to advance the stem, this movement being resisted by the spring. This will give the watch sufficient time to admit fluid pressure in front of the plunger 22, whereupon the stem is retracted, and the links spread the fender belt, as shown dotted in Fig. 4, to resist the shock.

In order to provide a means for absorbing the shock if the rear end of the fender is struck, the mechanism illustrated in Figs. 7 and 8 is provided, the same comprising a cylinder 36 in which a plunger 37 works, said plunger having a rod 38 which carries a head 39 at its outer end, said head being connected to the fenders by means of links 40 and levers 41. The head 39 is mounted in a suitable slideway 42. The cylinder 36, in front of the plunger 37, has a fluid-pressure inlet 43. Behind the plunger the cylinder is open. The levers 41 are pivotally connected to the hull 10, as indicated at 44, and their inner ends are connected by the links 40 to the head 39. The outer ends of the levers are connected to the rearmost blocks 16 of the fender belt, as indicated at 45.

In operation, when a side section of the fender belt is struck, the belt will swing toward the hull, whereupon the lever 41 through the link connection 40 will slide the head 39 rearward, pulling the plunger 37 in the same direction. Now, upon turning fluid-pressure into the cylinder 36, in front of the plunger 37, the head 39 is pulled forward, whereupon the levers 41 are swung in a direction to expand the fender belt to resist the impact of the shock.

The fender structure herein described provides an efficient safeguard against injury to the hull from collisions, and as the structure is devoid of complicated parts liable to get out of order, the fender is always ready to serve the purpose for which it is designed.

I claim:

1. The combination with the hull of a ship; of fenders extending along the sides thereof from the bow, said fenders being composed of hingedly connected sections, pivoted links carried by the hull and connected at their outer ends to the fenders, a slidable stem extending from the bow and having a connection at its outer end with the forward ends of the fender, and means for resisting the movement of said stem.

2. The combination with the hull of a ship; of a slidable stem extending from the bow thereof, means for resisting the movement of said stem, flexible fender belts extending along the sides of the hull and connected at their forward ends to the outer end of the stem, and pivoted supporting means for the fender belts carried by the hull.

3. The combination with the hull of a ship; of a slidable stem extending from the bow thereof, means for resisting the movement of said stem, flexible fender belts extending along the sides of the hull and connected at their forward ends to the outer end of the stem, and pivoted supporting means for the fender belts carried by the hull and normally holding said belts spaced from the hull.

4. The combination with the hull of a ship; of a slidable stem extending from the bow thereof, means for resisting the movement of said stem, flexible fender belts extending along the sides of the hull and connected at their forward ends to the outer end of the stem, and pivoted links carried by the hull and connected at their outer ends to the fender belts.

5. The combination with the hull of a ship; of a slidable stem extending from the bow thereof, means for resisting the movement of said stem, flexible fender belts extending along the sides of the hull and connected at their forward ends to the outer end of the stem, and pivoted links carried by the hull and connected at their outer ends to the fender belts, said links extending diagonally between the hull and the belts.

6. The combination with the hull of a ship; of fenders extending along the sides thereof from the bow, said fenders being composed of hingedly connected sections, pivoted links carried by the hull and connected at their outer ends to the fenders at the hinge between the sections thereof, a slidable stem extending from the bow and having a connection at its outer end with the forward ends of the fenders, and means for resisting movement of said stem.

7. The combination with the hull of a ship; of a slidable stem extending from the bow thereof, flexible fender belts extending along the sides of the hull and connected at their forward ends to the outer end of the stem, a plunger to which the stem is connected, a cylinder in which the plunger works, and means for admitting fluid pressure into the cylinder on either side of the plunger.

8. The combination with the hull of a ship; of a slidable stem extending from the bow thereof, flexible fender belts extending along the sides of the hull and connected at their forward ends to the outer end of the stem, pivoted supporting means for the fender belts carried by the hull, a plunger to which the stem is connected, a cylinder in which the plunger works, and means for admitting fluid pressure into the cylinder on either side of the plunger.

9. The combination with the hull of a ship; of a slidable stem extending from the bow thereof, flexible fender belts extending along the sides of the hull and connected at their forward ends to the outer end of the stem, a plunger to which the stem is connected, a cylinder in which the plunger works, means for admitting fluid pressure into the cylinder on either side of the plunger, a spring coiled around the stem, abutments on the stem between which abutments the spring is located, and holding means adjacent to opposite ends of the spring and engageable thereby when the stem is moved in the direction thereof, said means having openings through which the abutments on the stem may pass.

10. The combination with the hull of a ship; of a slidable stem extending from the bow thereof, flexible fender belts extending along the sides of the hull and connected at their forward ends to the outer end of the stem, a plunger to which the stem is connected, a cylinder in which the plunger works, means for admitting fluid pressure into the cylinder on either side of the plunger, pivoted supporting means for the fender belts carried by the hull, a spring coiled around the stem, abutments on the stem between which abutments the spring is located, and holding means adjacent to opposite ends of the spring and engageable thereby when the stem is moved in the direction thereof, said means having openings through which the abutments on the stem may pass.

11. The combination with the hull of a ship; of a slidable stem extending from the bow thereof, means for resisting the movement of said stem, flexible fender belts extending along the sides of the hull and connected at their forward ends to the outer end of the stem, pivoted links carried by the hull and connected at their outer ends to the fender belts, pivoted levers connected to the rear ends of the fender belts, and means for cushioning the movement of said levers.

12. The combination with the hull of a ship; of a slidable stem extending from the bow thereof, means for resisting the movement of said stem, flexible fender belts extending along the sides of the hull and connected at their forward ends to the outer end of the stem, pivoted links carried by the hull and connected at their outer ends to the fender belts, pivoted levers connected to the rear ends of the fender belts, a reciprocatory plunger, a cylinder in which said plunger is mounted, means for admitting fluid-pressure into the cylinder, a rod extending from the plunger, a head carried by the outer end of the rod, and a connection between said head and the aforesaid levers.

In testimony whereof I affix my signature in presence of two witnesses.

JACOBUS PHILIPPUS KAUSE.

Witnesses:
S. J. LEHRER,
H. G. BATCHELOR.